United States Patent [19]

Brunet et al.

[11] 3,887,579

[45] June 3, 1975

[54] METHOD OF MOLDING USING A POLYETHYLENE TEREPHTHALATE RELEASE FILM COATED WITH POLYETHYLENE SEBACATE

[75] Inventors: Jacques Brunet, Offranville; Jean-Claude Rigaux, Rillieux, both of France

[73] Assignee: La Cellophane, Paris, France

[22] Filed: Apr. 9, 1973

[21] Appl. No.: 349,615

[30] Foreign Application Priority Data

Apr. 21, 1972 France .............................. 72.14106

[52] U.S. Cl. .......... 264/316; 117/138.8 F; 161/231; 264/255; 264/257; 264/338

[51] Int. Cl. .............................................. B29c 1/04

[58] Field of Search ........... 264/130, 338, 213, 316, 264/255, 257; 117/5.1, 138.8 F; 161/231

[56] References Cited

UNITED STATES PATENTS

| | | | |
|---|---|---|---|
| 3,048,564 | 8/1962 | Heffelfinger | 117/138.8 F |
| 3,295,818 | 1/1967 | Kreier, Jr. | 264/338 |
| 3,431,331 | 3/1969 | Pincus | 264/338 |
| 3,636,150 | 1/1972 | Rowley et al. | 264/338 |

*Primary Examiner*—Robert F. White
*Assistant Examiner*—James B. Lowe
*Attorney, Agent, or Firm*—Sherman & Shalloway

[57] ABSTRACT

Biaxially drawn polyethylene terephthalate release films coated with a solution of polyethylene sebacate are used in a process for removing molded polymerized synthetic resin articles from a mold. The coated polyethylene terephthalate films can be used more times than previously used removal films and result in a surface appearance of the polymerized synthetic resin article which is free of defects. The coated polyethylene terephthalate release films are particularly suitable for use with the gel coat technique where the polymerized synthetic resin article is a polyester resin in a styrene solution.

8 Claims, No Drawings

METHOD OF MOLDING USING A POLYETHYLENE TEREPHTHALATE RELEASE FILM COATED WITH POLYETHYLENE SEBACATE

The present invention relates to polyethylene terephthalate release films coated with polyethylene sebacate and to processes of using the same in removing molded polymerized synthetic resin articles from a mold.

The prior art teaches many processes in which a polymerizable synthetic resin material polymerizes in a mold to form films and other shaped articles. For example, the prior art teaches methods of preparing flat or wavy plates and profiles of all shapes of laminated or stratified products using a synthetic resin base of phenolic resins, epoxy resins, polyester resins, or the like by placing the resinous composition mixed with glass fibers on molding elements and heating the combined layers to cause polymerization of the syntehtic resins and after cooling removing the molded article from the mold. The prior art also teaches that films of cellulose or polyethylene terephthalate can be placed between the resin and glass layers or between separate shapes formed in the same mold to facilitate removal of the molded article after polymerization has occurred and the final form of the article obtained. The use of the polyethylene terephthalate films has the advantage in that they are tougher than cellulose films and are capable of being reused many times before having to be discarded.

Recently, the use of styrene-polyester resins for making stratified or laminated plates of fiber reinforced resins has increased partially because styrene is actually an excellent solvent for polyethylene terephthalate and further because the styrene and polyethylene terephthalate copolymerize at similar temperatures which considerably facilitates their use. However, because styrene attacks the polyethylene terephthalate films, the period of their use is severely limited.

Mold release films formed from biaxially drawn polyethylene terephthalate films which have been coated with an organopolysiloxane layer are known to be capable of use as release films in disassembling molded elements from molds. These films give especially good results in the disassembling of molded pieces of polyester resins in methyl methacrylate solution. However, the organopolysiloxane does not always spread evenly enough, thereby making it difficult to obtain plates with a perfect flatness, and also causes the appearance of fish-eye defects, which becomes particularly evident when a resin containing a dye is used.

The present trend for facilitating the disassembling of molded articles is to use the gel coat technique, which consists in coating the mold release film with a thin layer of a copolymerizable polyester resin, generally in a styrene solution, mixed with a polymerization catalyst, and initiating polymerization of the polyester resin by passing the coated film through an oven for a relatively short period, sufficient to cause a gel-like consistency, followed by spreading a mat of glass fibers or the like coated with polyester resins on the gel and optionally covering the glass fibers with a new layer of polyester resin mixed with a polymerization catalyst; the several polyester layers are further polymerized in an oven for a time and at a temperature sufficient to obtain complete polymerization. This technique has the advantage of not permitting the glass fibers of the fibrous mat to break through to the surface and create weak points on the finished product.

In order to prepare wavy or shaped molded articles, the flat plate prepared by the gell coat technique is covered with a second mold release film and passed through a conformator before being put in the oven. Alternatively, for making several flat plates, several layers prepared by the gel coat technique are placed on one another with a release film placed between each layer.

While the gel coat technique offers very good results and is capable of a variety of uses, for the reasons previously noted, none of the mold release films are capable of extended usage.

It has now been discovered that by coating the polyethylene terephthalate release film with a layer of film forming polyethylene sebacate, the release film can be used more times than previously used removal films for disassembling molded polymerized synthetic resin articles, such as films and three-dimensional objects, from molds. In particular, polyethylene sebacate coated films of biaxially drawn polyethylene terephthalate can be used as release films in a gel coat process for molding synthetic resin articles using any synthetic resin which is inert and which will not copolymerize with or otherwise react with the polyethylene sebacate.

Accordingly, it is an object of the present invention to provide a process for disassembling molded pieces of polymerized synthetic resins using the gel coat technique and particularly for making molded articles from polyester resins formed from styrene solutions.

Another object of the present invention is to provide mold release films capable of extensive repeated usage and which do not cause defects in the surface appearance of the molded articles.

Still another object of the present invention is to provide release films formed from biaxially drawn films of polyethylene terephthalate coated with film forming polyethylene sebacate for use in disassembling molded synthetic resin articles from a mold.

Yet still another object of the present invention is to provide a process for disassembling molded articles of unsaturated polyesters in styrene solutions formed by the gel coat technique in which polyethylene sebacate coated films of biaxially drawn polyethylene terephthalate are used as release films between the molded articles and the mold elements.

According to the process of the present invention, biaxially drawn films of polyethylene terephthalate are coated with a layer of polyethylene sebacate and used as mold release films by placing the coated films between the mold elements and the synthetic resin to be molded and between the layers of such synthetic resin prior to further polymerization and curing. When the mold release films are used only to isolate the resin from the mold, the film can be coated on only one face in contact with the resin. Release films which are to be inserted between two resin layers must be coated on both faces.

The coated release films of the present invention are suitable for use with any moldable synthetic resin material which will not react with the polyethylene sebacate.

Particularly suitable resins to be molded in accordance with the present invention are the resins, such as, phenolic resins; epoxy resins; polyamide-imide resins; polybutadiene-type resins; polycarbonate resins; amino resins; unsaturated polyester resins, polyolefins, polyamides, etc.

Thermosetting unsaturated polyesters, e.g., those polyesters characterized by vinyl unsaturation in the polyester backbone, and formed by reacting a mixture of glycols (e.g., propylene or diethylene glycol); unsaturated dibasic acids or anhydrides (e.g., fumaric acid or maleic anhydride); and, optionally, a saturated dibasic acid or phthalic anhydride (e.g., isophthalic acid or phthalic anhydride) and dissolved in a reactive monomer, preferably styrene are most preferred.

The biaxially drawn polyethylene terephthalate films used in the process of the present invention can be made as thin as practical within the limits determined by the mechanical resistance and ease in handling required. Films having a thickness within the range of from 50 to 70 microns are, for example, capable of giving satisfactory results.

The polyethylene sebacate coating is a known film forming polyester obtained by the polycondensation between sebacic acid and ethylene glycol. According to the present invention, the mold release films of the biaxially drawn polyethylene terephthalate are coated with the polyethylene sebacate to provide a uniform film having a density within the range of about 0.05 to about 5 gms. per square meter, and preferably within the range of from about 0.1 to about 1.0 gms. per square meter and most preferably within the range of about 0.4 to about 0.6 gms. per square meter.

The coating can be performed by any conventional process such as, for example, smooth rolls, kiss coating, reverse roll coating, or the like, by means of screen rollers, by felt coating, etc.

The coating is deposited in the form of a solution in organic solvent and particularly a chlorinated solvent, such as, for example, trichloroethylene, or in a ketone such as acetone, methylethyl ketone, etc., or in a mixture of solvents; the concentration of the solution is determined by the desired thickness of the coating to be deposited on the polyethylene terephthalate film. The solvents are removed by any suitable drying process, such as heating, evaporation, etc. prior to use of the coated release films.

After elimination of the solvents by drying and the formation of the polyethylene sebacate film coating, the biaxially drawn polyethylene terephthalate mold release film is ready for use, preferably in the gel coating technique. For example, a sandwich consisting of layers of polyethylene sebacate coated release films, styrene solution of a resin of an unsaturated polyester, and mats of fiber glass or the like impregnated with resin are arranged on the desired number of layers and placed in a conformator or other compression type mold, followed by heating, for example, in an oven, at a temperature at which polymerization of the styrene solution will be complete. Preferably, with many of the current unsaturated polyester resins now available on the market, a temperature on the order of 80°C will be suitable. The polymerization is carried out at a temperature which is lower than the melting point of said polyethylene terephthalate release film and said polyethylene sebacate coating.

After cooling, disassembly of the molded article from the mold is readily accomplished, the films coated with the polyethylene sebacate being perfectly nonadherent. The plates or profiles obtained have a surface which is substantially completely free of defects.

By repeating the coating operation after each disassembling operation, it is possible to reuse the polyethylene terephthalate film if not an unlimited number of times, at least several dozen times, while obtaining plates or profiles having defect-free surfaces. Actually, the polyethylene sebacate coating forms a barrier to the styrene which would otherwise tend to attack the polyethylene terephthalate film. On the other hand, it constitutes a good wetter of the styrene solution of the unsaturated polyester resin to enable the latter to conform to the surface of the film with a perfect flatness. The polyethylene sebacate also avoids aging of the film because it regenerates it, eliminating the oligomers of polyester which could migrate to the surface.

For this reason, defects in the flat plates, such as streaks, or formation of powdery white films which have to be eliminated by washing with a ketone are eliminated; similarly, parasite waves located on the wave sides which are observed during manufacture of wavy plates are also eliminated.

The following examples are intended to give a better understanding of the scope of the present invention without being intended to be limiting thereof.

EXAMPLE 1

A sheet of biaxially drawn polyethylene terephthalate, having a thickness of 75 microns, is coated, by means of a rod, with a 10% solution of polyethylene sebacate in trichloroethylene. A deposit of 0.8 grams per square meter is obtained. A first layer of polyester resin, about 500 microns thick, is spread on the polyethylene sebacate coated sheet; the resin used is a commercially available unsaturated polyester resin, (Rhodester 3016 BL of the Societe Rhone-Poulenc, a styrene resin). The resin is mixed with a known conventional polymerization catalyst comprising a mixture of methyl ethyl ketone peroxide (Butanox of the Societe Rhone-Poulenc) and cobalt octoate at a ratio of 0.8% Butanox and 0.5% cobalt octoate to the total weight of the resins. A mat of glass fibers is placed on top of the layer of polyester resin and is covered with an additional 500 micron layer of the polyester resin.

The above sandwich is heated in an oven at 80°C for about 20 minutes. After cooling, the mold is disassembled by removing the film; removal from the mold is performed without difficulty; no sticking point occurs; the surface of the plate is perfectly smooth.

The polyethylene terephthalate film is again coated with polyethylene sebacate and reused in an identical process to prepare a second plate. This recoating process is used for more than 40 consecutive molding cycles, there being no deterioration of the polyethylene terephthalate film; the film is still capable of use in a considerable number of molding cycles.

When the same test is performed with an identical film of biaxially drawn polyethylene terephthalate without the coating of polyethylene sebacate, after only 6 to 8 operations, the film presents streaks, becomes whitish in appearance, and more and more numerous sticking points appear.

EXAMPLE 2

Two sheets of biaxially drawn polyethylene terephthalate, each 50 microns thick, are each coated with a layer of polyethylene sebacate in a solution of a 50–50 mixture of trichloroethylene and methyl ethyl ketone to provide a coating of 0.5 grams per square meter.

After drying the sheets to remove the solvent mixture, a 100 micron coating of a commercially available unsaturated polyester resin, (Stratyl A 116 of the Societe Pechiney-Saint-Gobain, a styrene resin commonly used for the preparation of plates and profiles) mixed with 0.8% by weight of Butanox and 0.5% by weight of cobalt octoate as polymerization catalysts are deposited on the polyethylene sebacate coated film.

Each of the layers is gelified or partially polymerized in an oven at 80°C for 5 to 10 minutes.

An additional layer of 0.5 mm thickness of the mixture of resin, Stratyl A 116 and its polymerization catalyst, is deposited on one coated and gelified sheet. A mat of glass fibers is deposited on the additional resin layer and is itself covered by a new layer of resin material. The second coated polyethylene terephthalate film is next placed upon the first sheet with the gelified layer in contact with the resin. The sandwich thus prepared is passed into a conformator where it obtains the shape of a wavy plate, and then placed into an oven at 80°C for 20 minutes where the final polymerization reaction occurs.

After cooling, the wavy plate obtained according to the improved gel coating technique, is easily removed from the mold. Its surface is perfectly smooth. In particular, it does not present any parasite waving on the wave sides.

The same films are again coated in an identical way with polyethylene sebacate and reused under the same conditions. The fortieth plate obtained does not differ from the first; the film always presents the same appearance and is capable of still a great number of uses.

It should be apparent that the foregoing examples establish the novel characteristics of the method of the present invention. While the present invention has been primarily described by reference to the foregoing exemplification and description of the preferred embodiments, it should be understood that the present invention should in no way be limited thereto but rather must be construed as broadly as all or any equivalents thereof.

What I claim is:

1. The method of removing molded polymerized synthetic resin articles from a mold by placing at least one polyethylene terephthalate release film in the mold between the mold elements and at least one synthetic resin article to be polymerized in said mold, comprising:

a. coating said polyethylene terephthalate release film on at least one face thereof with a uniformly distributed coating of polyethylene sebacate having a density within the range of about 0.05 grams per square meter to about 5 grams per square meter;

b. placing at least one coated release film in the mold between the mold elements and at least one synthetic resin article prior to polymerization of such synthetic resin article in said mold, such that each synthetic resin article is only in contact with said polyethylene sebacate coating;

c. polymerizing each synthetic resin article in said mold;

d. cooling each molded polymerized synthetic resin article; and e. removing each molded polymerized synthetic resin article from said mold and separating each release film from each molded polymerized synthetic resin article, said polyethylene sebacate coating being inert to said synthetic resin, and said polymerization step being carried out at a tempmerature which is lower than the melting point of said polyethylene terephthalate release film and said polyethylene sebacate coating.

2. The method of claim 1 wherein said polymerized synthetic resin is an unsaturated polyester resin.

3. The method of claim 1 wherein said polymerized synthetic resin is an unsaturated polyester resin in a styrene solution.

4. The method of claim 1 wherein said coating of polyethylene sebacate is applied to said polyethylene terephthalate release film from a solution in at least one organic solvent.

5. The method of claim 4 wherein said organic solvent is selected from trichloroethylene, acetone or methylethyl ketone or mixtures thereof.

6. The method of claim 1 wherein said polyethylene sebacate coating is applied to only one face of said polyethylene terephthalate film and only a single resin article as molded and said coated film is placed in said mold between mold elements and said synthetic resin with said coating in contact with said synthetic resin.

7. The method of claim 1 wherein said polyethylene terephthalate release film is coated on both faces with said polyethylene sebacate.

8. The method of claim 1 wherein said polymerization is performed by the gel coating technique.

* * * * *